United States Patent
Jayachandran et al.

(10) Patent No.: US 9,975,507 B2
(45) Date of Patent: May 22, 2018

(54) REINFORCEMENT BLOCK

(71) Applicant: FORD GLOBAL TECHNOLOGIES, LLC, Dearborn, MI (US)

(72) Inventors: Rajarathinam Jayachandran, Canton, MI (US); Erika Kristin Low, Ann Arbor, MI (US); Bhimaraddi Venkaraddi Alavandi, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/286,770

(22) Filed: Oct. 6, 2016

(65) Prior Publication Data
US 2018/0099631 A1   Apr. 12, 2018

(51) Int. Cl.
*B60R 19/18* (2006.01)
*B60R 19/22* (2006.01)
*B60R 19/02* (2006.01)

(52) U.S. Cl.
CPC ............ *B60R 19/18* (2013.01); *B60R 19/023* (2013.01); *B60R 19/22* (2013.01); *B60R 2019/186* (2013.01); *B60R 2019/1873* (2013.01)

(58) Field of Classification Search
CPC ....... B60R 19/18; B60R 19/22; B60R 19/023; B60R 2019/186; B60R 2019/1873
USPC .......................... 293/102, 120–122, 142–144
See application file for complete search history.

(56) References Cited

U.S. PATENT DOCUMENTS

| | | | | |
|---|---|---|---|---|
| 3,574,406 | A * | 4/1971 | Wessells, III | B60R 19/18 114/219 |
| 3,715,138 | A * | 2/1973 | Finkle | B60R 19/44 293/1 |
| 3,841,682 | A * | 10/1974 | Church | B60R 19/445 293/142 |
| 3,879,075 | A * | 4/1975 | Hale | B60R 19/46 267/140 |
| 4,023,841 | A * | 5/1977 | Wong | B60R 19/12 228/173.6 |
| 4,142,753 | A * | 3/1979 | Klie | B60R 19/18 293/102 |
| 5,080,411 | A * | 1/1992 | Stewart | B60R 19/18 293/102 |
| 5,803,514 | A * | 9/1998 | Shibuya | B60R 19/18 293/132 |
| 6,485,072 | B1 | 11/2002 | Werner et al. | |
| 6,817,638 | B1 * | 11/2004 | Choi | B60R 19/18 293/109 |
| 6,983,964 | B2 | 1/2006 | Murata et al. | |
| 7,114,587 | B2 * | 10/2006 | Mori | B60K 11/04 180/68.3 |
| 7,854,453 | B2 * | 12/2010 | Tanabe | B60R 21/0136 293/102 |
| 8,857,870 | B2 * | 10/2014 | Chiba | B60R 19/18 188/377 |
| 9,610,913 | B2 * | 4/2017 | Narita | B60R 19/483 |

(Continued)

*Primary Examiner* — Dennis H Pedder
(74) *Attorney, Agent, or Firm* — Jason Rogers; Brooks Kushman, P.C.

(57) ABSTRACT

A vehicle bumper assembly may include a fascia, a bumper beam arranged inside of the fascia including an upper portion and a lower portion, and a reinforcement block arranged only on the upper portion of the bumper beam and configured to absorb energy and to eliminate contact of the upper portion with the fascia during a collision.

16 Claims, 7 Drawing Sheets

(56) References Cited

U.S. PATENT DOCUMENTS

2007/0046044 A1\* 3/2007 Tanabe ................... B60R 21/34
 293/120
2016/0039376 A1\* 2/2016 Narita ................... B60R 19/483
 293/4

\* cited by examiner

REINFORCEMENT BLOCK

TECHNICAL FIELD

Disclosed herein are reinforcement blocks for vehicle bumpers.

BACKGROUND

Vehicles include a bumper that is the first substantial structure engaged during a collision. The bumper protects the vehicle from extensive damage by absorbing the impact force and preventing damage to other vehicle components. Collisions occurring below or over the bumper may result in damage to the body of the vehicle, requiring costly repairs to the vehicle.

SUMMARY

A vehicle bumper assembly may include a fascia, a bumper beam arranged inside of the fascia including an upper portion and a lower portion, and a reinforcement block arranged only on the upper portion of the bumper beam and configured to absorb energy and to eliminate contact of the upper portion with the fascia during a collision.

A reinforcement block for a vehicle bumper assembly may include an inverted L-shape body assembly configured to be arranged only on an upper portion of a bumper beam to inhibit the upper portion from contacting a fascia panel during a collision.

A reinforcement block for a vehicle bumper assembly may include an inverted L-shape elongated strip configured to be arranged only on an upper portion of a front side of a bumper beam to prevent contact between the upper portion and a fascia panel during a collision, the elongated strip including a fillet extending from an inner side of the elongated strip and engaging a chamfered edge defined by the upper portion of the bumper beam.

BRIEF DESCRIPTION OF THE DRAWINGS

The embodiments of the present disclosure are described with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Various insurance agencies may have criteria for vehicle damageability during collisions. These criteria may use low speed crash modes (e.g., 10 kph inline bumper and 15 kmp offset tests). In some jurisdictions, such as Europe for example, Low Speed Damageability (LSD) ratings are used by the insurance agencies to price and bill premiums to their customers. Thus, buyers may look to purchase vehicles that meet LSD requirements so as to reduce insurance costs.

In some vehicles, such as sport utility vehicles (SUVs), vehicle bumpers do not fully overlap vertically with the test bumpers. This may cause the bumper to absorb less of the crash energy and have a greater barrier intrusion into the vehicle. Because of the vertical misalignment, additional crush and damage to the vehicle may occur. Vehicles are often limited in the shelf space near the bumper and many components such as lamps, liftgates, etc. are arranged in the limited space around the bumper 102 that may be contacted and incur damage during a low speed crash.

Disclosed herein is a bumper assembly including a reinforcement block arranged on a top portion of a bumper beam. The reinforcement block may serve to eliminate, or at least lessen, the extent of an impact on various vehicle components such as a liftgate arranged adjacent to the bumper system. By arranging the reinforcement block at the top of the bumper beam, the reinforcement block serves to absorb impact energy and may provide for a buffer between the bumper beam and colliding objects. This shall in turn decrease the amount of longitudinal (rearward) movement of the bumper beam during impact, and shall decrease/eliminate the force when and if the bumper beam comes in contact with the vehicle parts in the vicinity, such as back panel.

Figure 1:
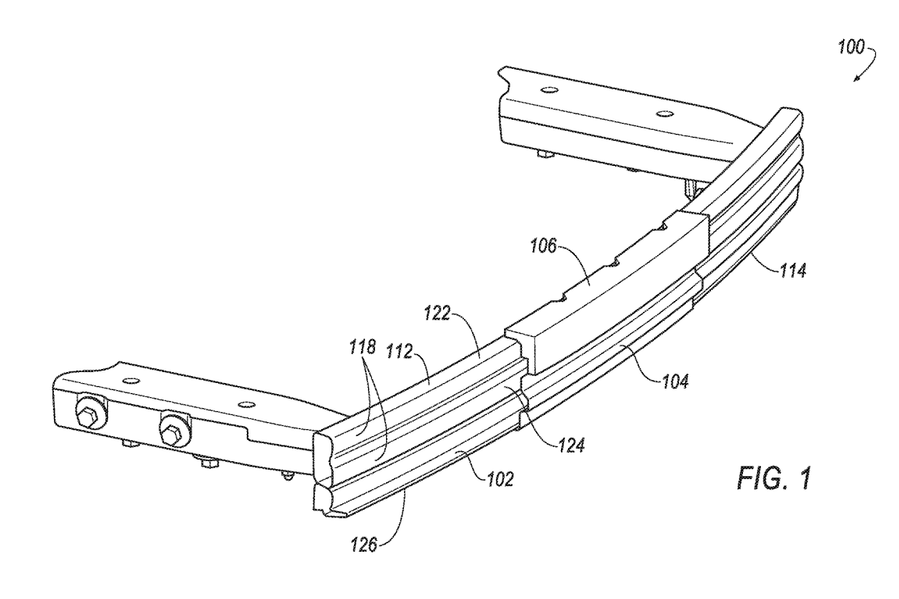
FIG. 1 illustrates an example bumper system for a vehicle.

FIG. 1 illustrates an example bumper assembly 100, or bumper 100, for a vehicle. In the examples described herein, the bumper system 100 is described as a rear bumper of a vehicle, though the bumper system 100 may be implemented as a front bumper of a vehicle. The bumper system 100 may include a bumper beam 102 configured to extend across the rear of the vehicle. The bumper beam 102 may be configured to absorb impact in a collision with another vehicle or object. The bumper beam 102 may be a metal bar, or a hollow tubular assembly, as shown in FIG. 1. The bumper beam 102 may be made of metal or other high density material including, but not limited to, elastomeric materials, plastic, polycarbonate (PC) and acrylonitrite butadiene styrene (ABS) materials.

The bumper beam 102 may define an upper portion 112 and a lower portion 114 arranged below the upper portion 112. Each of the upper and lower portions 112, 144 may define one or more beveled or chamfered edges 118. A center plate 104 may be arranged on the bumper beam 102 and a reinforcement block 106 may be arranged above the center plate 104.

The reinforcement block 106 may be configured to absorb impact energy from a separate object or vehicle during a collision. The reinforcement block 106 may be arranged on center of the bumper beam 102 on the upper portion 112. The reinforcement block 106 may extend over a top side 122 of the upper portion 112 of the bumper beam 102. The reinforcement block 106 may extend downward over a front side 124 of the bumper beam 102. The reinforcement block 106 may abut, or rest on top of the center plate 104. In an example where the centerplate 104 is omitted or not included in the bumper system 100, the reinforcement block 106 may extend to cover at least a portion of the front side 124 of the bumper beam 102.

In the examples shown, the reinforcement block 106 does not extend across or along the entire front face 126 of the bumper beam 102. Instead, the reinforcement block 106 is centered on the bumper beam 102 and rests on the top side 122 of the bumper beam 102. The reinforcement block 106 also extends partially downward along the front side 124 to cover a portion of the front side 124. The reinforcement block 106, however, does not extend the entire height of the bumper beam 102. The reinforcement block 106 may extend to cover half of the height of the bumper beam 102.

The reinforcement block 106, as explained, may absorb crush energy created by a collision. The reinforcement block 106 may also act as a spacer separating the bumper 100 from crashing into the external object.

Figure 2A:
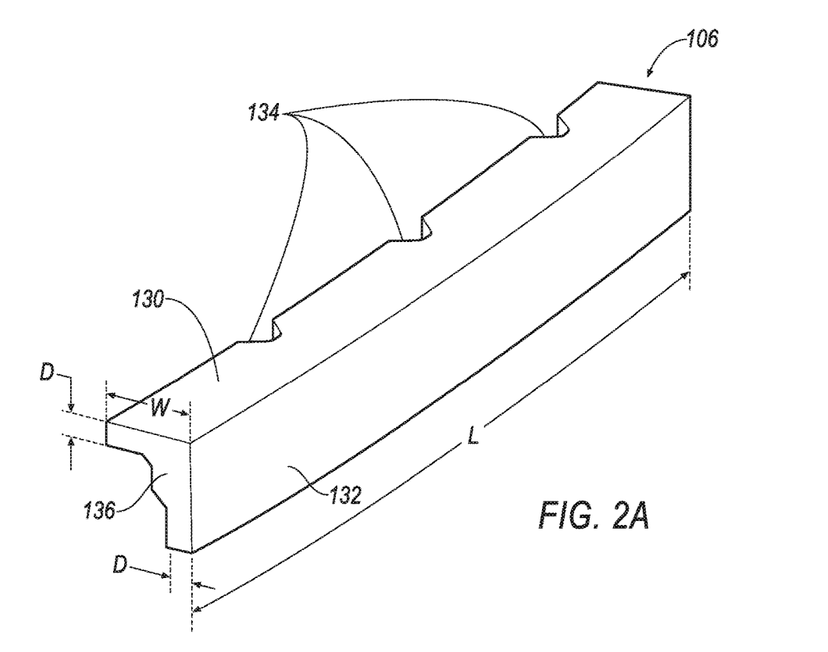
FIGS. 2A and 2B illustrates an example reinforcement block.
Figure 2B:
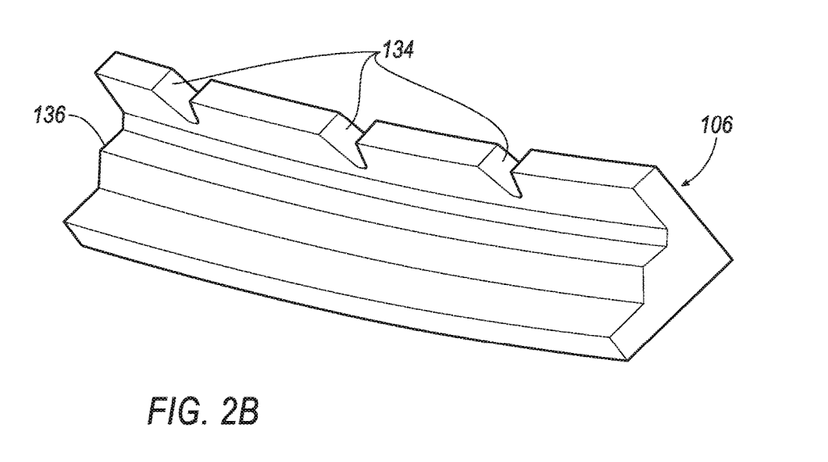

FIGS. 2A and 2B illustrate the example reinforcement block 106. The reinforcement block 106 may form an inverted L-shape body configured to fit around the upper portion 112 of the bumper beam 102. The reinforcement block 106 may include a first portion 130 and a second portion 132 configured to abut the first portion 130 to form the L-shape. The first portion 130 may be configured to be fixed on the top side 122 of the bumper beam 102. The second portion 132 may be arranged on or fixed to the front side 124 of the bumper beam 102.

The first portion 130 may define at least one groove 134 or a plurality of grooves, as shown in FIG. 2. However, the reinforcement block 106 may not include any grooves and may form a solid surface at the first portion 130.

As best seen in FIG. 2B, the reinforcement block 106 may include a fillet or a projection 136 protruding from an intersection of the first and second portions 130, 132 on an inner side of the reinforcement block 106. The projection 136 may be configured to fit within or along the chamfered edges 118 of the front side 124 of the bumper beam 102. The projection 136 may aid in keeping more material thickness towards the top corner of the bumper beam 102. This additional material thickness may serve as a spacer block to limit intrusions from the colliding objects.

Figure 3A:
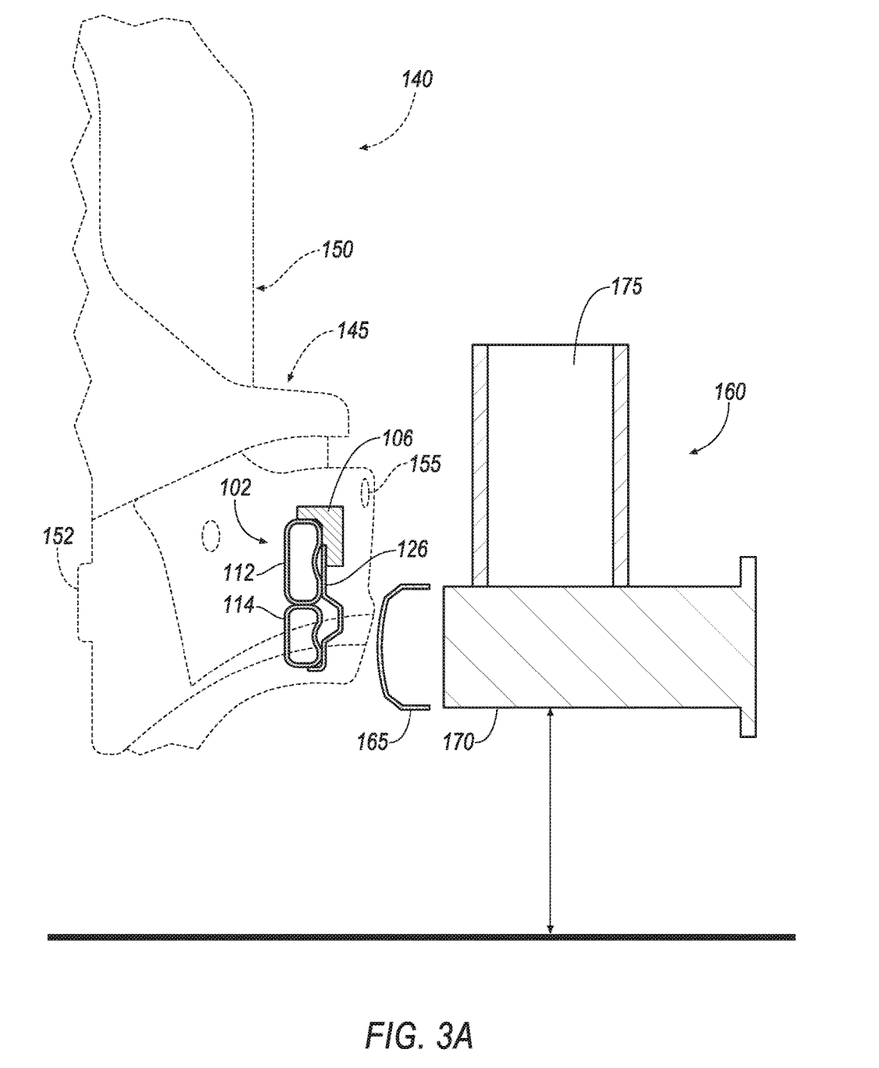
FIG. 3A illustrates a side view of the bumper system packaged in a rear of a vehicle.

FIG. 3A illustrates a side view of the bumper system 100 within a vehicle 140 in a test set-up. The vehicle 140 may include a bumper fascia 145 or fascia panel and a liftgate 150. The fascia 145 may be formed of a soft plastic material configured to cover the bumper beam 102. Also, shown in the FIG. 3A is back panel 152 which forms the rear portion of the vehicle trunk. The back panel 152 may experience collision forces through vehicle components stacked between the bumper and itself (such as fascia 145, foot rest components, etc.,) in a collision and may benefit from protection during low speed collisions. The liftgate 150 may be controlled and operated by various liftgate components 155 arranged adjacent to the liftgate 150 within the vehicle 140 behind the fascia 145. The liftgate components 155 may include cameras, motors, controllers, latches, etc. The bumper beam 102 and the reinforcement plate 106 are covered by the vehicle fascia 145. Often times the liftgate components 155 may be arranged within a recessed portion of front or rear end structures. These components may be easily damaged when low speed collisions cause impact over or under the bumper beam 102

During testing as well as during use (e.g., when parked), the vehicle 140 may come into contact with another object 160, such as another vehicle. The object 160 or vehicle may include a bumper 165 attached to a fixture 170, and a back plate 175 extending upwards from the fixture 170. The object 160 includes an RCAR test bumper 165.

Figure 3B:
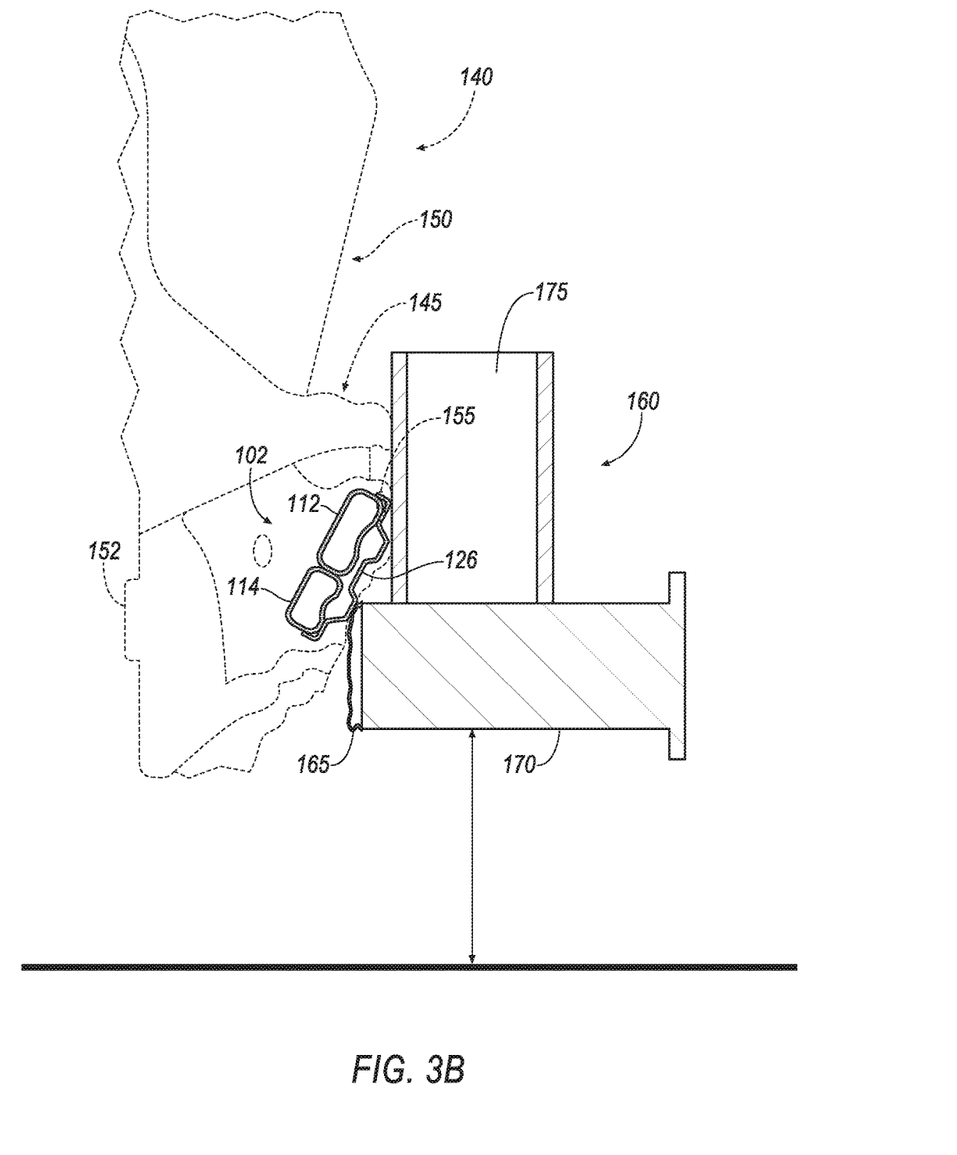
FIGS. 3B and 3C illustrate a side view of the bumper system when the bumper system comes into contact with another object.
Figure 3C:
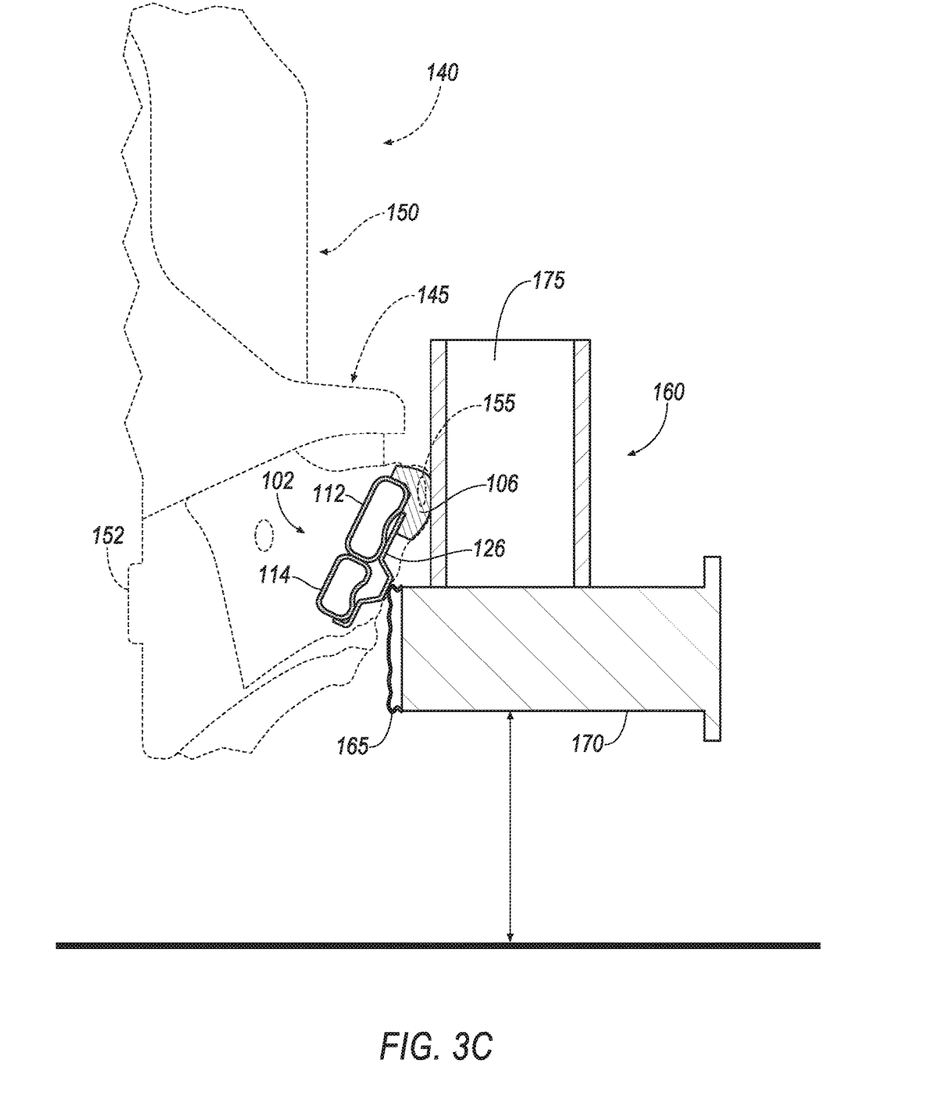

FIGS. 3B and 3C illustrate a side view of the bumper system 100 when the bumper system of the vehicle comes into contact with another object 160. FIG. 3B illustrates an example including the reinforcement block 106, while FIG. 3C illustrates an example without a reinforcement block 106.

During operation, during testing, and when parked, vehicles may come into contact with various objects. The vehicle may back into an object or another vehicle while parking. In another example, while the vehicle is parked, another vehicle may come into contact with the vehicle. Furthermore, another vehicle may rear-end the vehicle while both are moving. During low relative speed rear-end collisions, an object 160 may come into contact with the fascia 145 of the vehicle bumper 100. The object 160 may bend or crush the fascia 145 at a point of contact. Some contact may be insignificant and cause minor or no damage to the vehicle bumper 100. However, some contact may cause damage to the vehicle that may be expensive and time consuming to repair.

Contact may be especially damaging when an SUV or vehicle with a higher bumper position is involved in a rear end collision. Vertical mismatch of the bumper beams during a collision may result in one vehicle overriding the other. This may result in more extensive intrusion and more damage to both vehicles. During this type of collision, often times bumper top and bottom corners are effective contact areas. Because the reinforcement block 106 is arranged over the bumper beam 102, the reinforcement block 106 may soften the impact to the critical components and absorb energy as well as function as a spacer to keep certain components from being effected by the collision.

For example, depending on the amount of force, the object 160 may push the fascia 145 into the lower portion 114 of bumper beam 102. When the lower portion 114 of the bumper beam 102 is pushed into the vehicle due to the bumper 100 coming into contact with the object 160, the upper portion 112 may be conversely forced forward toward the fascia 145 just above the point of contact. Referring to FIG. 3C, when the upper portion 112 comes into contact with the fascia 145, the bumper beam 102 may come into contact with portions of the liftgate components 155. Consequently, the liftgate components 155 may be pushed upward, or towards the fascia 145.

Referring back to FIG. 3B, the reinforcement block 106 may be arranged on the upper portion 122 of the bumper beam 102. In this example, the reinforcement block 106 may come into contact with the fascia 145, preventing the bumper beam 102 from doing the same. As explained above, the bumper reinforcement block 106 may be formed of a compressible material, such as foam-like material. The block 106 may be formed of one or more commercially available foams. One example material may be Expanded Polypropylene (EPP) foam which is an engineered plastic foam material. Additionally or alternatively, the block 106 may be an aluminum hex block. Because of its compressible composition, the reinforcement block 106 provides a cushion between the bumper beam 102 and the fascia 145. During collisions, the reinforcement block 106 would press against the fascia 145, which in turn is pressed against back plate 175 of the RCAR fixture or an intruding component of the colliding vehicle. Due to the cushioning effect of the reinforcement block 106, intrusion of the bumper 102 towards the back panel 152 or liftgate 150 is reduced. This in turn may reduce or eliminate the impact force and damage to the liftgate 150, components 155, and back panel 152.

The liftgate components 155 include some of the more expensive components to repair. Back panel 152 is the integral part of the trunk sheet metal and any damage to it is very expensive to repair/replace, as well as the liftgate 150. The reinforcement block 106 may provide an inexpensive barrier to protect the liftgate components 155, liftgate 150, and back panel 152 during rear-end collisions.

Figure 4A:
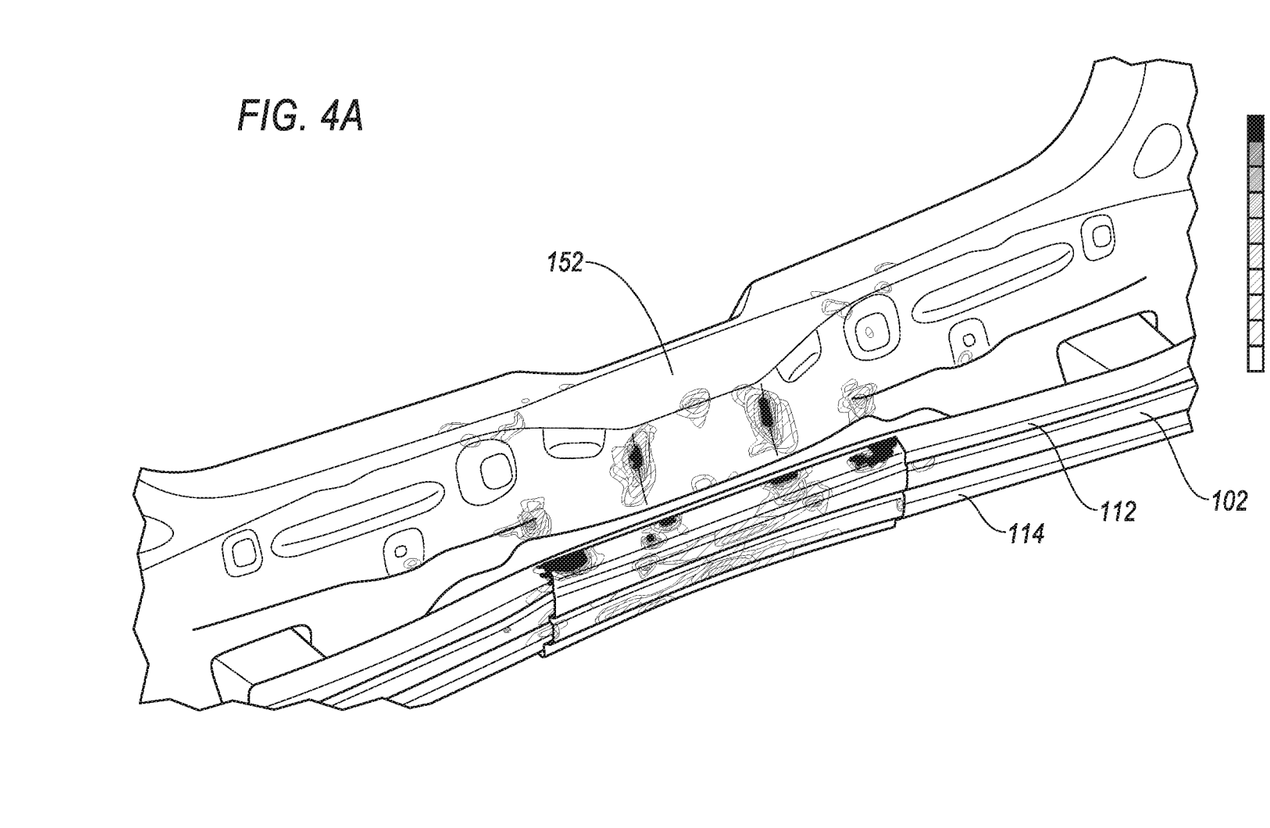
FIG. 4A illustrates an example stress analysis of a bumper and vehicle structure in response to a rear-end collision where a reinforcement block is not implemented.
Figure 4B:
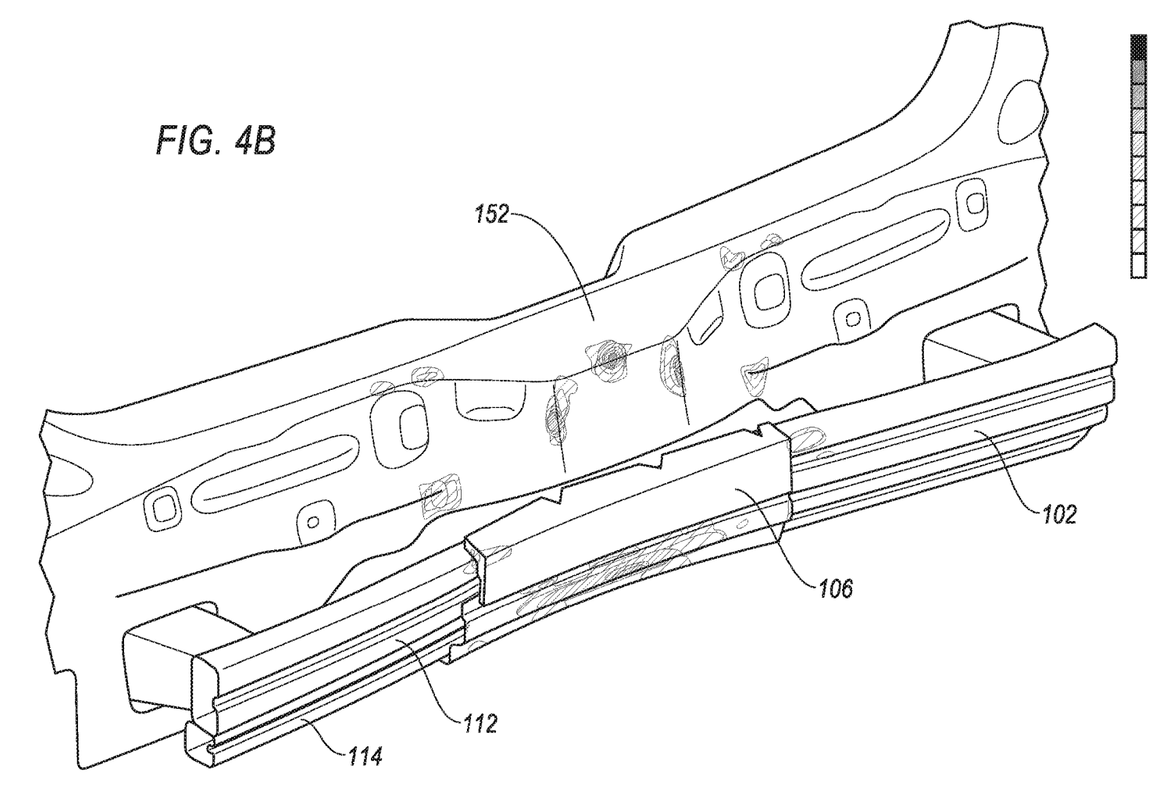
FIG. 4B illustrates an example stress analysis for a bumper and vehicle structure in response to a rear-end collision where a reinforcement block is arranged on the upper portion of the bumper beam.

FIG. 4A illustrates an example simulated stress analysis of a bumper 100 in response to a rear-end collision without a reinforcement block 106. FIG. 4B illustrates an example stress analysis for a bumper 100 in response to a rear-end collision with a reinforcement block 106 arranged on the upper portion 112 of the bumper beam 102. As shown, the bumper beam 102 is subject to a larger buckle in FIG. 4A. Further, the internal stress from the upper portion 112 of the bumper beam 102 contacting the back panel 152 is greater in FIG. 4A. Thus, the reinforcement block 106 reduces the amount of buckling of the bumper beam 102, as well as the stress on the back panel 152 as evident from FIG. 4B, as compared to FIG. 4A.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle bumper assembly, comprising:
   a fascia;
   a bumper beam arranged inside of the fascia including an upper bumper portion and a lower bumper portion; and
   an L-shape strip arranged on -the upper bumper portion, the strip including a fillet extending from an inner corner of the strip and increasing thickness at the inner corner to absorb energy to engage a chamfered edge defined by the upper portion of the bumper beam.

2. The vehicle bumper assembly of claim 1, wherein the L-shape strip is arranged across a portion of the upper bumper.

3. The vehicle bumper assembly of claim 1, wherein the L-shape strip is arranged on a front face of the bumper beam.

4. The vehicle bumper assembly of claim 3, wherein the bumper beam defines a chamfered edge extending across the upper portion of the bumper beam.

5. The vehicle bumper assembly of claim 1, wherein the L-shape strip comprises a foam polymer material.

6. The vehicle bumper assembly of claim 1, wherein the L-shape strip comprises an aluminum hex block.

7. A reinforcement block for a vehicle bumper assembly, comprising:
   an inverted L-shape body assembly configured to be arranged only on an upper portion of a bumper beam to inhibit the upper portion from contacting a fascia panel during a collision, and
   a projection extending outwardly from an inner side of the body to increase a thickness of the body assembly towards the upper portion to serve as a spacer from colliding objects and engaging a chamfered edge defined by the upper portion of the bumper beam to serve as a spacer.

8. The reinforcement block of claim 7, wherein the body is arranged across a portion of the upper portion of the bumper beam.

9. The reinforcement block of claim 7, wherein the body is arranged on a front face of the bumper beam.

10. The reinforcement block of claim 7, wherein the body comprises a foam material.

11. The reinforcement block of claim 7, wherein the body comprises an aluminum hex block.

12. A reinforcement block for a vehicle bumper assembly, comprising:
    an inverted L-shape elongated strip configured to be arranged on a top corner of a bumper beam to prevent contact between the top corner and a fascia panel during a collision, the elongated strip including a fillet extending from an inner side at an inner corner of the elongated strip to increase a thickness of the strip towards the top corner of the bumper beam to serve as a spacer from colliding objects and engaging a chamfered edge defined by the bumper beam.

13. The reinforcement block of claim 12, wherein the elongated strip is arranged across a portion of the bumper beam.

14. The reinforcement block of claim 12, wherein the elongated strip is arranged on a front face of the bumper beam.

15. The reinforcement block of claim 12, wherein the elongated strip comprises a foam material.

16. The reinforcement block of claim 12, wherein the elongated strip comprises an aluminum hex block.

* * * * *